No. 619,683. Patented Feb. 14, 1899.
J. G. EBKEN.
CARRIAGE BRAKE.
(Application filed Aug. 18, 1898.)
(No Model.)
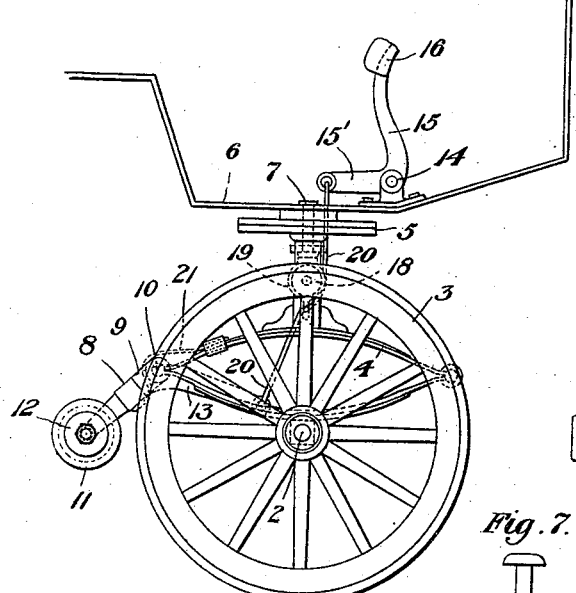
Fig. 1.
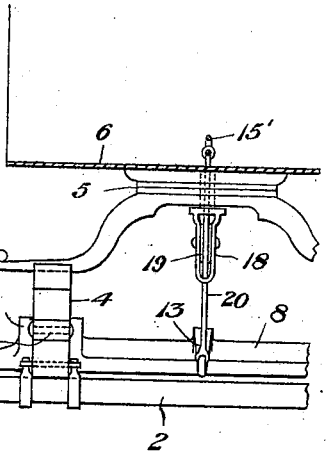
Fig. 3.
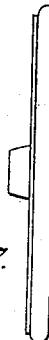
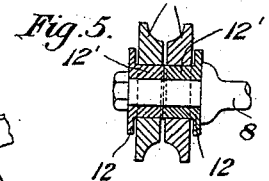
Fig. 7.
Fig. 5.
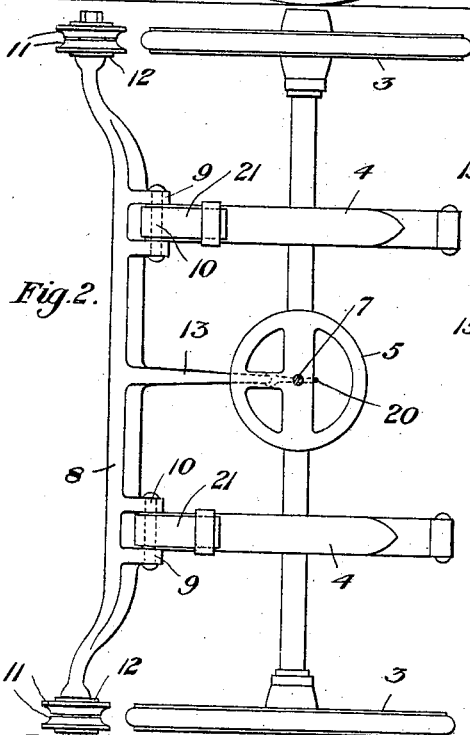
Fig. 2.
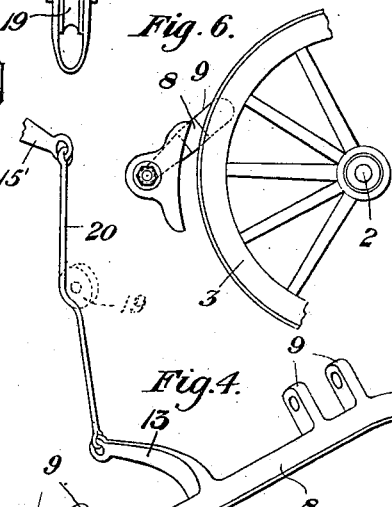
Fig. 6.
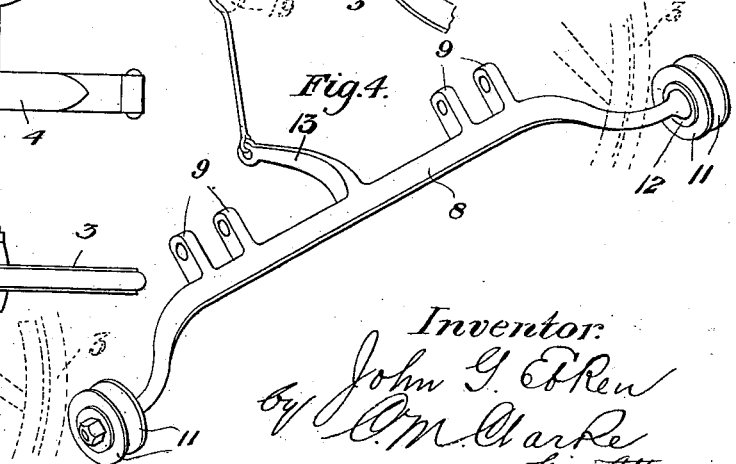
Fig. 4.
Witnesses
Watson Large
C. C. Butterfield
Inventor:
John G. Ebken
by C. M. Clarke
his Attorney.
THE NORRIS PETERS CO., PHOTO-LITHO., WASHINGTON, D. C.

UNITED STATES PATENT OFFICE.

JOHN G. EBKEN, OF PITTSBURG, PENNSYLVANIA, ASSIGNOR OF ONE-HALF TO PETER H. LIND AND HENRY C. HACHMEISTER, OF SAME PLACE.

CARRIAGE-BRAKE.

SPECIFICATION forming part of Letters Patent No. 619,683, dated February 14, 1899.

Application filed August 18, 1898. Serial No. 688,838. (No model.)

*To all whom it may concern:*

Be it known that I, JOHN G. EBKEN, a citizen of the United States, residing at Pittsburg, in the county of Allegheny and State of Pennsylvania, have invented or discovered a new and useful Improvement in Carriage-Brakes, of which the following is a full, clear, and exact description, reference being had to the accompanying drawings, forming part of this specification, in which—

Figure 1 is a view in side elevation of the front of a carriage equipped with my improved brake. Fig. 2 is a plan view. Fig. 3 is a partial end elevation. Fig. 4 is a perspective detail view of the brake-bar and operating connections. Fig. 5 is a detail sectional view of the braking-shoe applicable to rubber tires. Fig. 6 is a similar view showing the application of an ordinary brake-shoe to a flat tire. Fig. 7 is a detail view of the king-bolt and the sheave-wheel swivelly mounted on its lower end.

My invention relates to brakes for carriages and other vehicles; and it consists of means for applying the braking-shoe to the front wheel, the apparatus being mounted on the front running-gear and entirely independent of the bed, while being applicable at any position of the front wheels.

Referring to the drawings, 2 is the front axle, on which are the wheels 3 and supporting elliptic springs 4, upon the top of which is supported the usual fifth-wheel 5. The forward platform of the carriage 6 is connected therewith by the customary king-bolt 7, passing downwardly through the upper stationary and lower revoluble members of the fifth-wheel in the usual manner.

8 is a brake-beam extending across the running-gear framework from side to side, having lugs 9, which are pivotally connected by bolts 10 to the eye of the spring. Upon the ends of the brake-beam, in positions adapted to bear against the tires of the wheels when the beam is tilted, are the brake-shoes, made in two halves 11 11, meeting at the center and formed so as to constitute a groove adapted to fit over a rubber tire, each of the halves having a slight play laterally, so as to spread upon coming into contact, thereby preventing pinching of the tire. On the outside of the halves are washer-bearings 12, having inwardly-extending hubs 12', meeting at the center, which take up the thrust of the halves and prevent binding on the end stem of the beam. At the center the beam is provided with a forwardly-extending crank-arm 13, by which the beam is operated to bring the shoes into contact.

Pivoted in a bracket 14 on the platform is a foot-lever 15, having a treadle end 16 and crank-arm 15'. Swiveled on the lower end of the king-bolt is a sheave-bearing 18, in which is mounted a grooved sheave-wheel 19, around which passes a cable 20, connected to the ends of the brake-beam crank-arm 13 and the crank-arm 15' of the foot-lever.

Leaf-springs 21, secured to the elliptic springs and adapted to bear upon the pivoted arms of the brake-beam, exert a pressure outwardly, by which the shoes are normally held outwardly away from contact with the tires at a slight distance of from one to two inches. Upon exerting pressure upon the foot-lever the brake-shoes will be applied to the tires and exert a braking action in proportion to the force applied, the halves 11 rotating with the tire and preventing cutting.

In the case of an ordinary shoe the brake is applied by the usual frictional contact.

The advantages of an efficient brake for carriages will be appreciated by users of this class of vehicles, and my device is extremely simple and cheap and may be applied to a great variety of vehicles with little trouble or cost.

Having described my invention, what I claim, and desire to secure by Letters Patent, is—

1. A carriage-brake consisting of a brake-beam pivotally attached to the running-gear provided with shoes, and a crank-arm, a foot-lever, a connecting-cable and a sheave-wheel mounted in a bearing swiveled to the end of the king-bolt, subtantially as set forth.

2. A carriage-brake consisting of a brake-beam pivotally attached to the ends of the springs provided with brake-shoes and a crank-arm, a foot-lever mounted on the forward platform, a connecting-cable or the like and a sheave-wheel mounted in a bearing swiveled to the end of the king-bolt, substantially as set forth.

3. A carriage-brake consisting of a brake-beam pivotally attached to the ends of the springs provided with brake-shoes and a crank-arm, a foot-lever mounted on the forward platform, a connecting-cable or the like and a sheave-wheel mounted in a bearing swiveled to the end of the king-bolt and retracting-springs adapted to bear against the supporting-arms of the brake-beam to relieve the shoes from contact, substantially as set forth.

4. In a braking apparatus of the class described, a double-sided circular brake-shoe forming a concave groove, flanged washers permitting lateral play of the halves of the shoe having internally-extending hubs upon which the shoe is journaled, and a central supporting extension of the brake-beam upon which the washers are mounted, substantially as set forth.

5. In combination with a brake-beam pivotally attached to the running-gear provided with a crank-arm and operating mechanism mounted on the vehicle-body, a double-sided circular brake-shoe mounted on bearing-washers permitting lateral play secured upon the ends of the brake-beam, substantially as set forth.

In testimony whereof I have hereunto set my hand.

JOHN G. EBKEN.

Witnesses:
  WM. H. LEAHY, Jr.,
  C. M. CLARKE.